(12) United States Patent
Wilson

(10) Patent No.: US 7,444,352 B2
(45) Date of Patent: *Oct. 28, 2008

(54) AUTOMATIC PRUNING OF ORPHANED OBJECTS FROM DIRECTORY SERVICES AND OTHER DATABASES

(75) Inventor: Steven B. Wilson, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

This patent is subject to a terminal disclaimer.

(21) Appl. No.: 10/858,234

(22) Filed: Jun. 1, 2004

(65) Prior Publication Data

US 2004/0267797 A1 Dec. 30, 2004

Related U.S. Application Data

(62) Division of application No. 09/527,309, filed on Mar. 16, 2000, now Pat. No. 7,127,471.

(60) Provisional application No. 60/145,597, filed on Jul. 26, 1999.

(51) Int. Cl.
G06F 7/00 (2006.01)
G06F 17/00 (2006.01)

(52) U.S. Cl. ................................ 707/103 R; 707/104.1

(58) Field of Classification Search ........................ None
See application file for complete search history.

(56) References Cited

U.S. PATENT DOCUMENTS

| 5,544,316 | A | | 8/1996 | Carpenter et al. ............ 719/310 |
|---|---|---|---|---|
| 5,625,818 | A | * | 4/1997 | Zarmer et al. ............. 707/104.1 |
| 5,692,129 | A | * | 11/1997 | Sonderegger et al. ... 707/103 R |
| 6,021,425 | A | * | 2/2000 | Waldron et al. ............. 718/103 |
| 6,047,289 | A | | 4/2000 | Thorne et al. ............... 707/10 |
| 6,182,157 | B1 | * | 1/2001 | Schlener et al. ............. 719/318 |
| 6,223,207 | B1 | | 4/2001 | Lucovsky et al. |
| 6,292,801 | B1 | | 9/2001 | Campbell et al. ............ 707/10 |
| 6,598,037 | B1 | | 7/2003 | Craig et al. .................... 707/1 |
| 6,901,436 | B1 | * | 5/2005 | Schneider .................... 709/219 |

(Continued)

OTHER PUBLICATIONS

"Printer_Info_7," *Microsoft Developer's Network CD*, Microsoft Corporation, 1999.

(Continued)

*Primary Examiner*—Apu Mofiz
*Assistant Examiner*—Susan Chen
(74) *Attorney, Agent, or Firm*—Lee & Hayes, PLLC

(57) ABSTRACT

In view of the foregoing, the present invention provides a method and system for improving the operating system to provide benefits to a variety of database management applications and network administration by facilitating deletion of references to published objects that have become unusable, i.e., orphaned. This is enabled by implementing, preferably as part of the operating system, in a separate thread, a module that uses a set of presumptions to detect orphaned objects that can be deleted. A preferred embodiment avoids deleting objects that may have been created by old software versions or persistent objects or objects that are likely to be transiently unusable. Upon detection of suitable orphaned objects the module deletes the orphaned object from the set published objects. This strategy allows pruning of the set of published objects during times of low network usage and reduces the avoidable overhead associated with publishing objects while improving the performance and stability of the system for longer time periods.

15 Claims, 8 Drawing Sheets

U.S. PATENT DOCUMENTS 7,127,471 B1    10/2006    Wilson

OTHER PUBLICATIONS

"Microsoft Windows 2000 Active Directory Technical Summary," *Microsoft Developer's Network CD*, Microsoft Corporation, Aug. 1998.

B. Hussain, "Understanding LDAP," *Dr. Dobb's Journal*, pp. 78-82, Mar. 1999.

"IADsPrintQueue," *Microsoft Developer's Network CD*, Microsoft Corporation, 1999.

"IADsPrintQueue Property Methods," *Microsoft Developer's Network CD*, Microsoft Corporation, 1999.

Dino Esposito, "Cutting Edge: ADSI Overview," *Microsoft Internet Developer Network CD*, Microsoft Corporation, May 1999.

Don Anderson, "Overview of the IEEE 1394 Architecture," *FireWire System Architecture*, MindShare, Inc.: Reading, Massachusetts, chapter 2 (1999).

* cited by examiner

AUTOMATIC PRUNING OF ORPHANED OBJECTS FROM DIRECTORY SERVICES AND OTHER DATABASES

RELATED APPLICATIONS

This application is a continuation of U.S. application Ser. No. 09/527,309, filed Mar. 16, 2000 entitled "Automatic Pruning of Orphaned Objects from Directory Services and Other Databases" which claims priority from the U.S. provisional application No. 60/145,597, filed on Jul. 26, 1999.

TECHNICAL FIELD

This invention relates generally to development of computer operating systems for managing databases and more particularly to the development of easy to administer databases.

BACKGROUND OF THE INVENTION

There is an increasing appreciation for the need for ease of use in managing large networks and databases. This is necessary to permit maximal exploitation of the potential of networks by large and small enterprises in sharing resources, tracking inventory, accounting, and carrying out transactions among the myriad of tasks that are required of a well managed organization. The cost of upkeep and administrative support for electronic databases is a significant factor in the cost-benefit analysis undertaken by potential electronic database users. Furthermore, the possibility of expanding the reach and nature of objects managed by a single enterprise requires efficient management of a very large number of objects in a single database while requiring as little supervision and upkeep as possible.

Use of distributed computer networks to implement databases results in more responsive databases, including local updating and management in multiple master systems. Redundancy built into a distributed implementation results in a more resilient and reliable database.

A database may be thought of as constituting two essential properties, viz., a collection of data objects and a set of procedures/tools/methods for locating a particular one of the data objects. The procedures/tools/methods for locating a particular object are included in a directory service. The directory is a namespace that aids in resolution of an identifier to a corresponding object. Commercial databases typically include storage for the objects and implementations of directory services for navigating the directories.

Application programs, including database management programs, are typically written for execution on a particular platform, which may be a virtual machine. Modern platforms include a plurality of services and appropriate management strategies to allow different applications access to system resources. These services provide many of the functions that applications are expected to use and thus free the application writer from worrying about the more mundane implementation details. Not surprisingly, this is an effective strategy since having a single coherent implementation reduces complexity and enhances design of stable computing systems capable of executing different applications. An important advance in designing stable computing systems has been the development of platforms using multithreaded systems, which are described further below.

Traditional OSs for personal computers used a single threaded architecture in which programming code was executed in a serial fashion. A thread is a path of execution within a process that is recognized and provided time on the processor by the OS. Each application usually has at least one thread and, thus, is assigned time in accordance with its relative priority. It should be understood that the term thread refers to code that is provided execution time slices by the OS. This does not foreclose a developer of an application to define a path of execution within the application such that the application itself directly controls the time allocated to a particular path while the OS may be unaware of its existence. For clarity, such developer defined execution paths are referred to as "fibers" as opposed to threads.

Not surprisingly, any misstep could result in a fatal bottleneck in a single threaded system. In contrast, in a multi-threaded architecture the OS exercises greater control over the execution of different tasks. The OS schedules slices of time on the processor for identified units termed threads.

An effective strategy, in addition to using threads, in the management of network resources, effectively a database, has been to automate many tasks. Many of these administrative tasks are provided by the operating system if many applications are likely to benefit from a common implementation. However, since many administrative tasks require manual intervention to address machine failures, user errors or bugs in the software. Consequently, not being routine, they often require manual intervention due to the difficulty in automating them. There is a need for stable management systems that perform well over ever longer periods of time. A database management system may be roughly understood to be a combination of database applications and the relevant operating system services.

Operation of computer software over a long period of time often results in perceptible performance degradation as a result of an accumulation of smaller defects or "bugs." Each of the small defects, in isolation, does not cause a noticeable reduction in system performance. Some examples of such errors include resource leakage due to failure to recover all of the resources allocated in course of carrying out the various tasks. In many embodiments it may even be undesirable to track each small error, and instead it may be preferable to correct the error when it is necessary to correct a degradation in system performance or when it is relatively less expensive to make the correction.

The development of databases for managing very large collections of information presents novel problems. An important development in database design has been the use of object oriented technology resulting in representing a database as a collection of objects related by inheritance. For convenience, an object may be considered to be a collection of attributes and methods, which are also collectively termed properties of an object. An object may contain other objects and may be related to other objects by inheritance. One of the attributes that all objects in a database may be expected to have is a name.

An advantageous naming strategy treats the database as a namespace organized as a tree. This naming strategy assigns a distinguished name ("DN") to each object in a database. The distinguished name is a complete description of the position of the object in the database. In addition, a relative distinguished name ("RDN") may be defined that provides a path to access an object in a database from a particular node in the tree structure. Thus, DN is a name relative to the root node in a tree like database. Furthermore, in object-oriented databases the DN of an object may be searched using its attributes, e.g., by conducting a tree traversal.

"WINDOWS®" brand operating systems manufactured by the "MICROSOFT®" corporation of Redmond, Wash., use such a namespace organized into a tree structure. Advantageously, a security boundary enclosing a part or the whole of the tree defines a domain such that users in a domain need only log in at one node in order to have access to the entire domain, which may include many different networked computers. Several such domains may be related by trust relationships to form a tree of domains. Several non-contiguous trees constitute a forest and it is even possible to imagine collection of forests.

Finding resources, i.e., objects, easily is an important consideration in the design and management of networks. These resources may be printers, scanners, keyboards, workstations, data, applications or even other users. However, it is unlikely that every resource is likely to be sought to the same extent. Some resources may be unavailable due to security or other concerns and thus locating them successfully may be of limited value in any event. "Publishing" resources intended to be discovered by users results in increased efficiency since a published resource is available at suitable domain controllers as part of a directory and cross-referenced against its DN. This allows localized searches at the domain controller for discovering published resources' DN as opposed to a tree traversal spread out over the network. In a domain there may be several domain controllers that replicate changes in the directory to make them available at each controller. In a preferred embodiment, the domain controllers are related by peer relationships and introducing a change at any one domain controller results in the propagation of the change to every other domain controller in the domain, thus making searches for the DN of an object of interest possible at an easily accessible domain controller, hence faster.

In a large network the number of published resources can grow to include millions of objects and adversely impact on the management of the namespace. Thus it is of interest to remove unusable objects, i.e., orphaned objects, from the directory to ensure that the directory can remain stable over as long a period of time as possible without incurring a large overhead, resource leaks or compromising access to resources.

SUMMARY OF THE INVENTION

In view of the foregoing, the present invention provides a method and system for improving the operating system to provide benefits to a variety of database management applications and network administration by facilitating deletion of references to published objects that have become unusable, i.e., orphaned. This is enabled by implementing, preferably as part of the OS, in a separate thread, a module that uses a set of presumptions to detect orphaned objects that can be deleted. Orphaned objects are objects that can no longer be used, usually due to invalid references. Thus the module checks the status of objects in a specified category to evaluate whether they contain valid references and attributes. The module, preferably, also checks whether the inaccessibility, if any, is due to a failure of the machine hosting them, and thus likely to be transitory, rather than the object itself.

A preferred embodiment avoids deleting objects that are intended to be persistent or objects that are likely to be only unusable for a short period of time. Upon detection of suitable orphaned objects the module deletes the orphaned object reference and any subtree with the orphaned object at its root node from the published objects. This strategy allows pruning of the published objects. Appropriate priority assignments allow these tasks to be performed during times of low network.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may best be understood from the following detailed description taken in conjunction with the accompanying drawings of which:

DETAILED DESCRIPTION OF THE INVENTION

Figure 1:
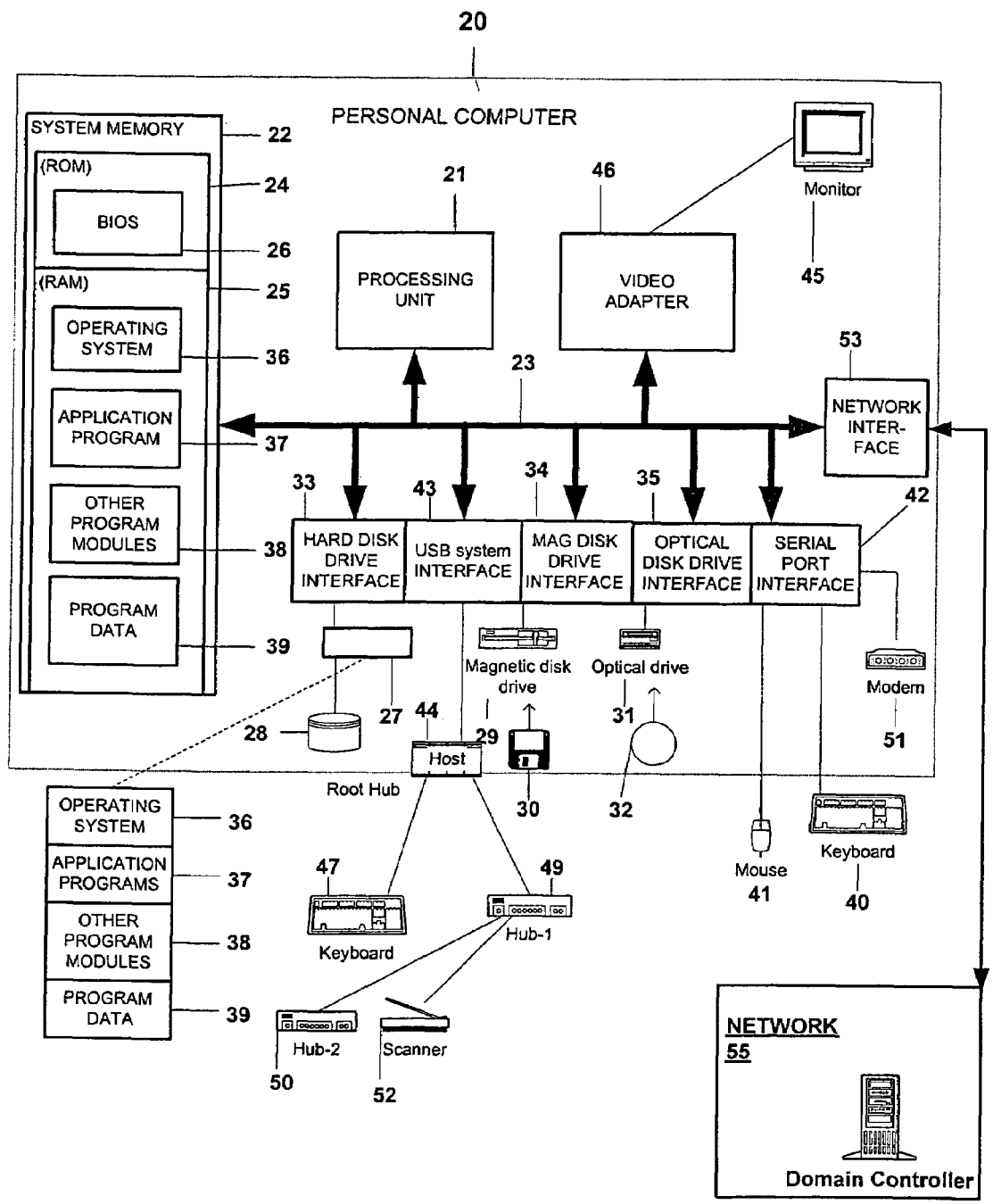
FIG. 1 is a block diagram generally illustrating an exemplary computer system used in forming networks on which the present invention resides, at least in part.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner understood by those possessing ordinary skill in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Illustrated are keyboard 47, and a hub-1 49 connected to the root hub/Host 44. Hub-1 49 is further connected to a hub-2, 50, and scanner 51.

Other interfaces that may be used include parallel ports, game ports, and the FireWire, i.e., the IEEE 1394 specification available at http://standards.ieee.org/catalog/bus.html#1394-1995. A monitor 45 or other type of display device is also connected to the system bus 23 via an interface, such as a video adapter 46. In addition to the monitor, personal computers typically include other peripheral output devices. A network interface 53 allows the computer 20 to communicate with a network 55, which includes a plurality of domain controllers. The components within network 55 may use high bandwidth connections and switches as well as large memory storage devices to service users, such as computer 20, accessing the network 55.

The server/personal computer 20 may operate in a networked environment using logical connections to one or more remote computers/servers. The remote computer may be another personal computer, a server, a router, a network PC, a peer device or other common network node, and typically includes many or all of the elements described above relative to the personal computer 20 in FIG. 1. Such networking environments are commonplace in offices, enterprise-wide computer networks, intranets and the Internet.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
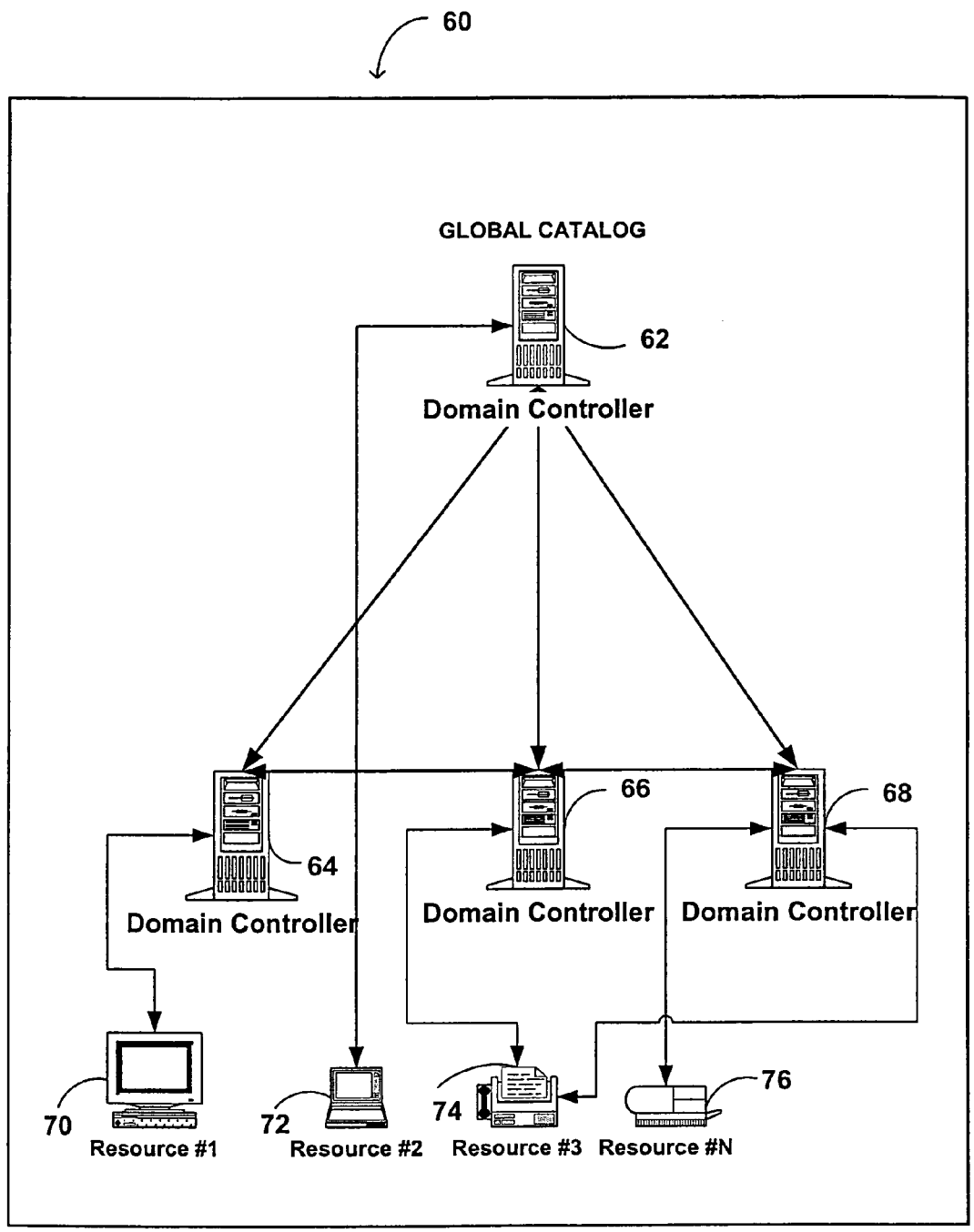
FIG. 2 is a schematic providing an overview of a typical network domain with domain controllers and resources.

FIG. 2 illustrates a preferred embodiment of a domain with several domain controllers that are peers of each other, i.e., no master-slave relationships. Instead, one or more of the domain controllers provide a global catalogue containing an abbreviated directory of objects from the domain in question and other domains or interest. These domains may be connected together to form a domain tree or in the same forest or even another forest. The objects contained in a global catalogue usually have only a subset of their attributes listed to facilitate likely searches. Thus in FIG. 2, pure domain 60 has domain controller 62 which can directly communicate with domain controller 64, domain controller 66 and domain controller 68 on high speed high bandwidth linkages, which are indicated by thick directed lines. Furthermore, domain controller 62 carries a global catalogue. All the domain controllers replicate any relevant changes to the directory to and from each other, and hence maintain an updated directory.

Each of the servers in the network need not maintain the entire directory, and instead, some servers may maintain and update a defined part of the directory.

Consequently, an administrator need only introduce a change at one domain controller in order to propagate the change throughout the domain since all relevant servers will receive and accept changes in the relevant parts of the directory maintained by them. Furthermore, in order to provide unambiguous identification for each object in the directory, a globally unique identifier (GUID) is assigned to the object when it is created or modified. In a preferred embodiment this is a 128 bit number, which is generated by an algorithm that guarantees its uniqueness. Thus, reorganizing the tree structure does not necessarily result in the loss of the object identity since the GUID is still the same. And furthermore, objects of interest, e.g., users and groups have friendly names selected for being shorter and easier to remember than the DN.

FIG. 2 also illustrates several resources in the network. User workstation 70 is connected to the domain controller 64, portable computer 72 is hooked to the domain controller 62, fax machine 74 is connected to the domain controller 66 and the domain controller 68 while the printer 76 is connected to the domain controller 66 as well. Naturally, these linkages need not be direct, and intermediate proxies and servers are possible in many networks. Each of these resources is represented by an object in the directory to permit use by other authorized users.

Figure 3:
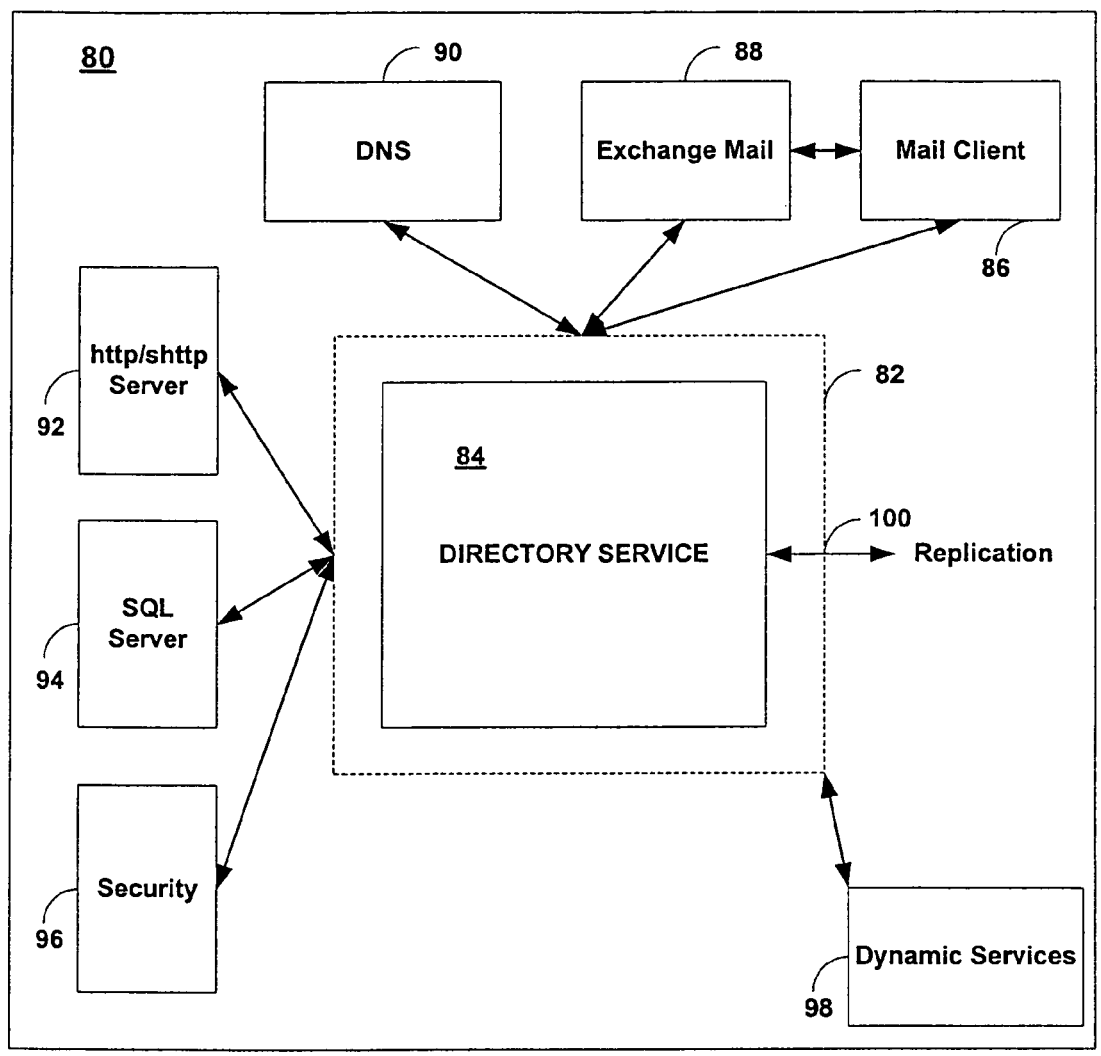
FIG. 3 illustrates a schematic of the different uses made of a directory and a directory service in a network.

FIG. 3 illustrates a typical domain and the services that are likely to access the directory and directory service. In a domain 80 there is a directory 82 with a directory service 84 which is used by mail client 86, exchange server 88, domain name server 90, http/shttp server 92, SQL server 94, Security 94 and Dynamic Services 98. The directory is updated via replication operations 100. Naturally, not all of these services need be entirely be contained within the domain, and access by authorized users from outside the domain is possible as well.

Figure 4:
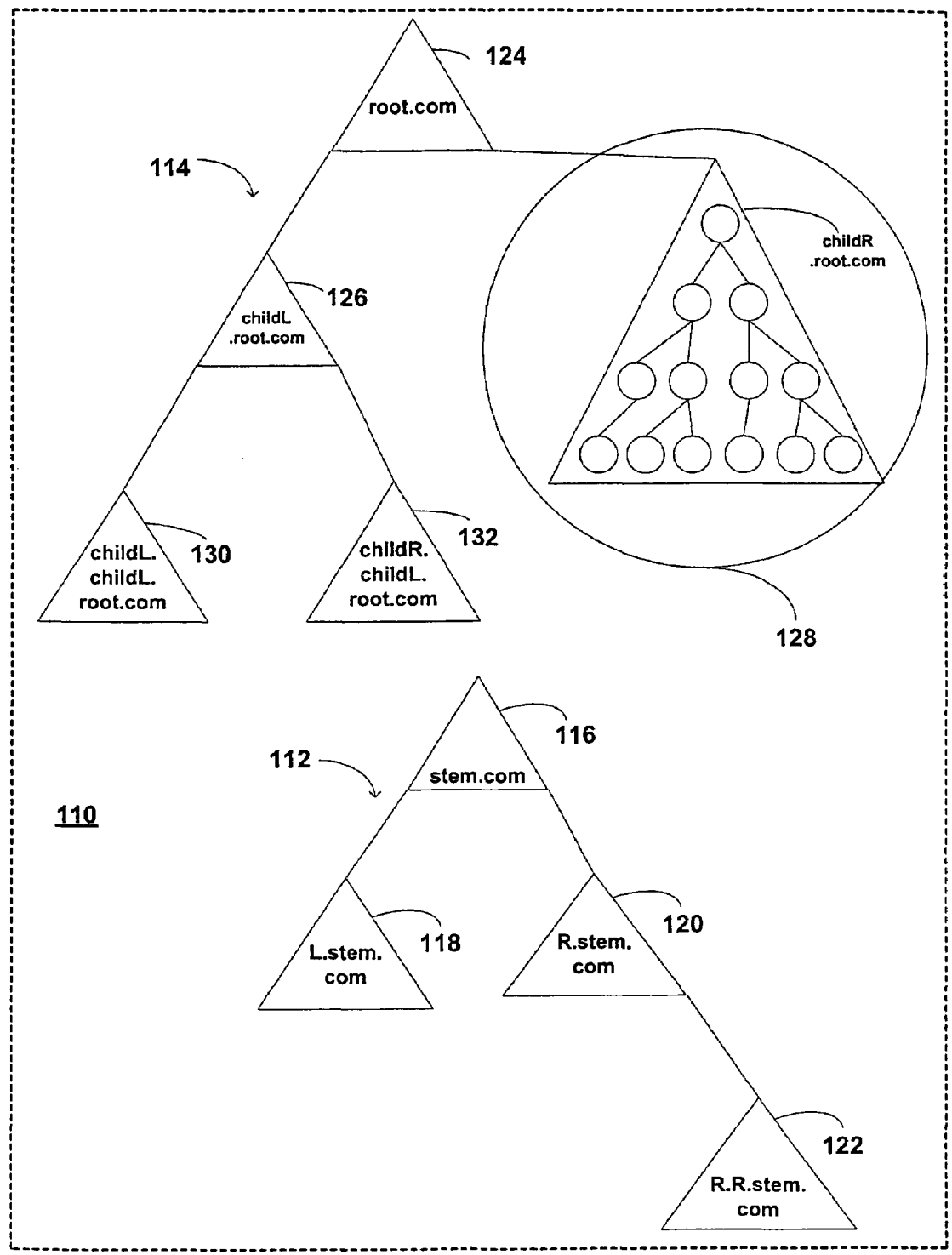
FIG. 4 illustrates a possible implementation for a database in the form of a namespace to form domains, domain trees and forests.

FIG. 4 illustrates a forest 110 with two domain trees, viz., domain tree 112 and domain tree 114 to illustrate the interaction of namespaces and the security boundaries defining domains. The names of the domains within each of the domain trees reflect the namespace. Thus, in the domain tree 112 there is a root node stem.com 116 with child nodes L.stem.com 118 and R.stem.com 120. Child node R.stem.com 120 further has a connection to a domain node R.R.stem.com 122. Similarly, the domain tree 114 has a root node 124 connected to childL.root.com domain node 126 and childR.root.com 128. As is illustrated, the domain node 128 is enlarged to show a plurality of objects within it forming the domain. Finally, in the tree 114 domain node 126 is connected to childL.childL.root.com domain node 130 and childR.childL.root.com domain node 132. The trees 112 and 114 do not form a contiguous namespace, and thus are separate, but are parts of the forest 110. Each of the domains preferably maintain their own directories and provide a directory service as well as authorized access to users from other domains.

Searching for desired objects in the directory can be accomplished by means of a directory service, which provides methods for manipulating objects in a tree, traversing subtrees and the like. An advantageous strategy for finding resources is to publish the resources that are likely to be sought by users in the network. Publishing is the act of creating objects in the directory that either directly contain the desired information or provide a reference to the desired information in order to make it highly accessible. A printer with particular abilities and restricted access may be published by the printer server along with a listing of the particular abilities and the limited access allowed to permit authorized interested users to discover and use the printer.

For convenience an exemplary published printer can be designated as a first printer object with a globally unique identifier and is associated with a print server, which publishes the printer and may control access to the printer, and a spooler at the print server for managing data input to the printer.

If the print server should crash or the spooler fail, the first printer object becomes unusable since it contains invalid references to logical printers. Thus, the first printer object may become orphaned. If the server comes on line again, it is possible that it may create a new second printer object with a new globally unique identifier if it cannot find the first printer object in the Directory. Thus, the first printer object becomes an orphan because although it is published, it is not owned by any printer server. Similar considerations apply to other objects such as expired user accounts. Naturally, over the lifetime of a database such orphaned objects are likely to increase. Furthermore, such objects may not be the terminal nodes in a tree, but may instead be the root nodes of a subtree, and hence further add to the overhead of unusable information that the directory has to maintain and search. An example may be a print server with a printer that is, in turn, connected to a scanner and camera.

In a preferred embodiment based on the "WINDOWS 2000®" server operating system manufactured by the "MICROSOFT®" of Redmond, Wash., the objects in the directory support component object model ("COM") interfaces and form an active directory, i.e., a directory that has methods for its use integrated into its structure. The availability of defined interfaces allows for a robust active directory service with methods to facilitate tree traversal and search routines to discover desired objects in response to queries based on desired attributes. Thus, one may search, using the active directory service interface ("ADSI"), for all users having the last name "Fiddler" or for all printers that support color printing and are accessible to a general user and the like.

Objects published in an active directory may have DN corresponding to other domains in the same domain tree or forest to which the domain controller hosting the active directory belongs. Furthermore, not all objects are equally likely to be orphaned.

Figure 5:
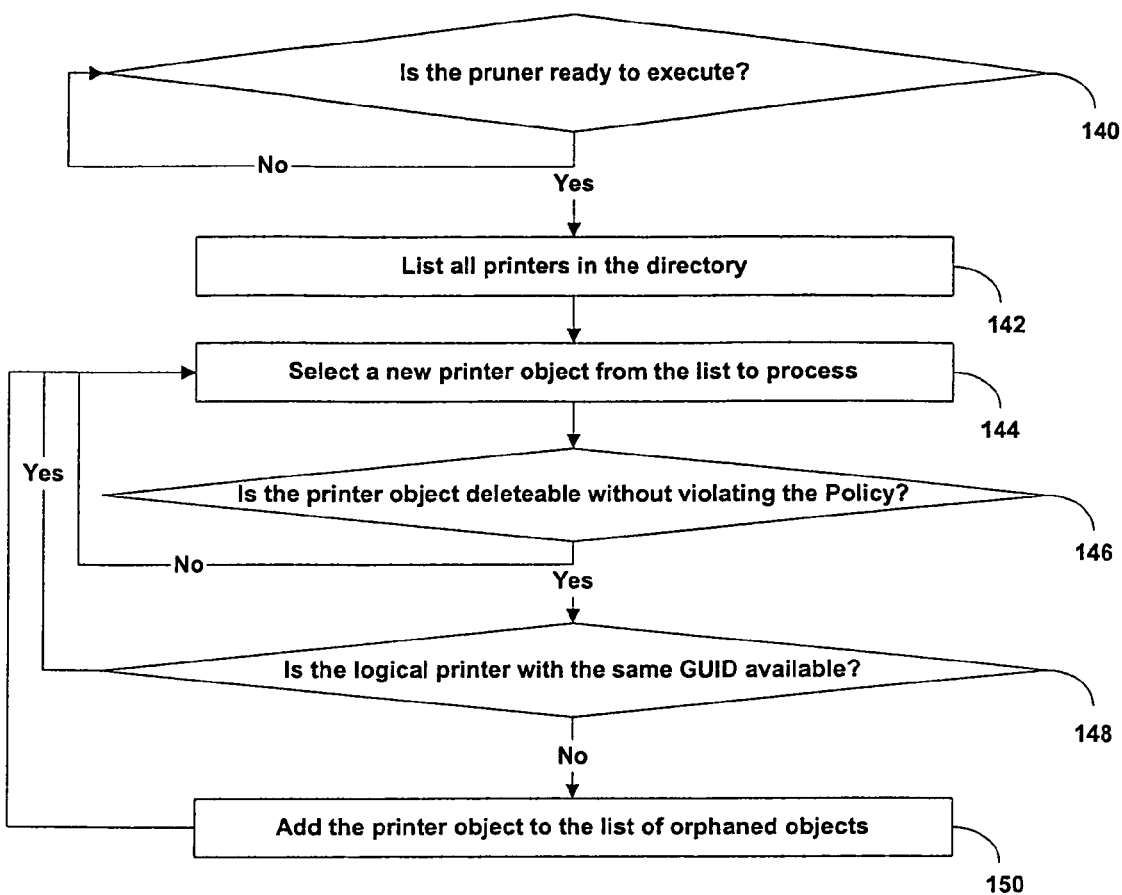
FIG. 5 illustrates a possible implementation of the pruner in generating a list of orphaned printer objects.

FIG. 5 illustrates an embodiment of the invention that advantageously implements a "pruner" module in a thread executed at each domain controller to detect and remove orphaned objects of a specified type. Thus, e.g., a pruner may be designed to detect orphan printer objects periodically and remove them from the directory in a manner that is safe. Printer objects are created (published) in a Directory by machines hosting the logical printer. The objects in the Directory contain attributes which describe characteristics of the printer such as location, speed, paper loaded, and so forth. The hosting machine (print server) is responsible for publishing and unpublishing the printer object, as well as updating the attributes. Under normal conditions, the print objects in the Directory will all reflect active and useable printers.

When a print server is shut down, it does not unpublish the printer object. This leaves an orphaned printer object in the Directory which cannot be used for creating printer connections. In order to provide a useful list of printers in the Directory, a mechanism for deleting orphaned printer objects is required. This mechanism is called the "pruner". The pruner service is part of the spooler service and only runs on Domain Controllers within a domain. By default, every Domain Controller (DC) runs the pruner and periodically checks for orphaned printer objects.

The algorithm used for deleting orphaned printer objects published by print servers within the domain is as follows: First, at a user-configured interval, the DC will obtain a list of all printer objects published in the domain's Directory. For each printer object, if the printer object is deleteable (printer objects contain an "undeleteable" attribute that tells the pruner not to delete it, if set) and is on the same Site as the DC, the DC will verify that the printer is available.

Second, if the DC finds that the printer is not available it will add the printer object to a list of orphaned printers since the printer appears to be inoperative. By default, the DC checks for orphaned printers every 8 hours and will delete the orphaned printer the third time it finds it is orphaned. There are policies which allow administrators to set the pruning interval (how often the DC checks for orphans) and number of retries. Administrators can also disable pruning altogether.

Third, it is possible that a pruner will delete a published printer by mistake during network outages. To minimize this problem, you can set a policy, which will cause the print server to periodically verify that its published printers are still published. Alternatively, another policy can be set which causes all printers published by a given server to be unpruneable.

Fourth, when the print server is booting up, it verifies that all published printers are still published. Thus, if the pruner has deleted a printer object in the Directory after the print server was shut down, the print server will republish it when it is rebooted.

There are two types of published printers: those published by the machine that hosts the printers, and those which are hosted by a different machine than the one publishing it. The latter type of published printer is called "downlevel published". Downlevel published printers are handled differently by the pruner because the hosting machine does not verify that the printers are published when it boots up. In fact, the hosting machine is unaware that any of its printers are published.

There are three methods governing the way downlevel published printers are pruned. The default method is to never prune downlevel printers. The second method is to prune downlevel published printers only if the print server can be contacted. The third method is to prune downlevel published printers whether or not the print server can be contacted (this is identical to the non-downlevel method described above). Downlevel published printers are pruned using the same method described in the four steps above, except that the GUID check is not performed (because the print server does not know the GUID).

Figure 6:
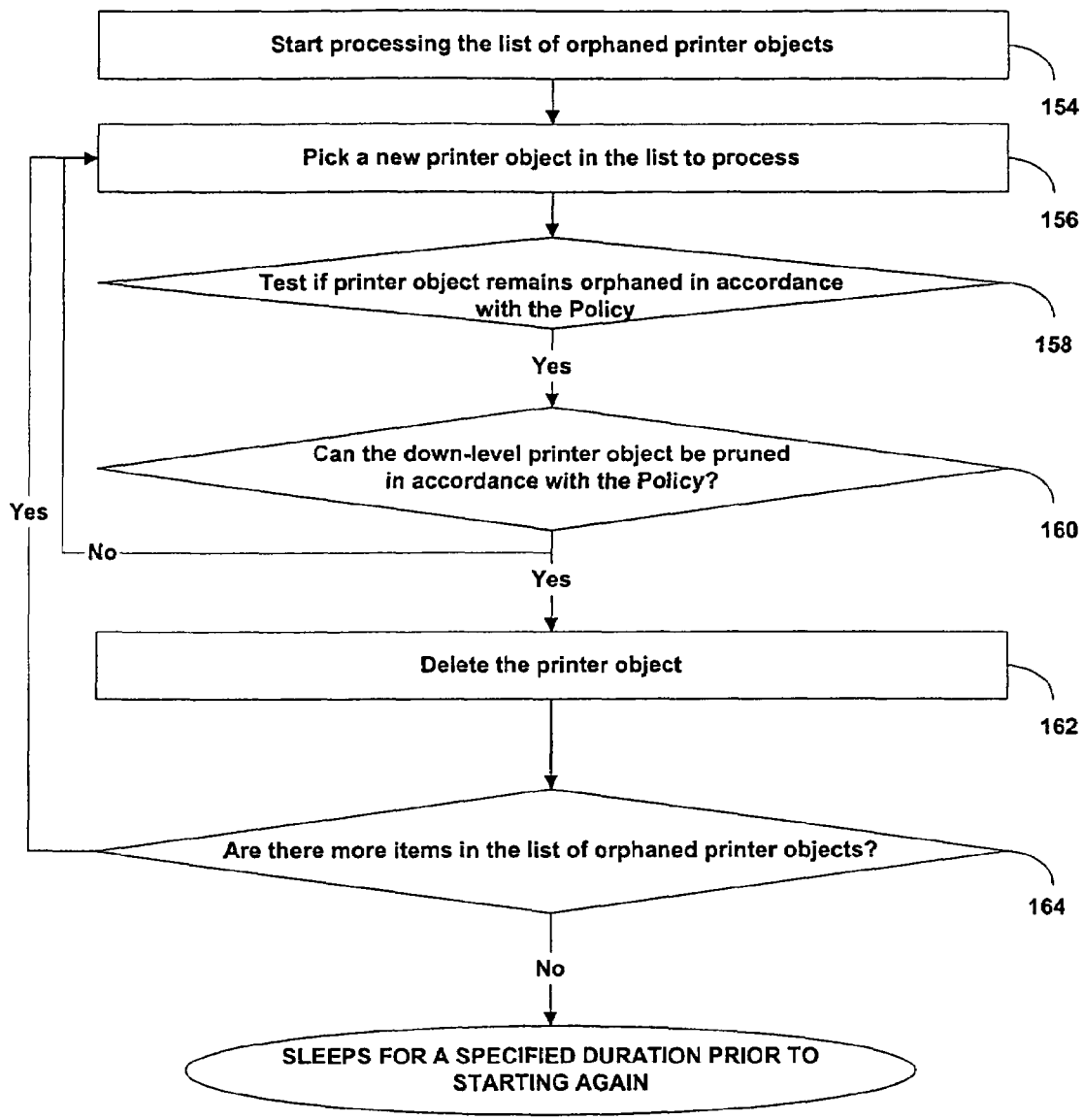
FIG. 6 illustrates a possible strategy in actually pruning printer objects in the list of orphaned objects.

These considerations are illustrated in FIGS. 5 and 6 in the exemplary case of printer objects. Turning to FIG. 5, the pruner module is launched if it is ready to execute (step 140). The pruner is preferably implemented on its own thread that has an assigned priority. This priority can be set to a low value so that the pruner runs when the domain controller is not busy, and thus can be advantageously used to attend to administrative tasks. If the pruner is ready to execute, a list is made of all the printers in the directory, which is available at the domain controller (step 142). One of the items in the list of printer items is selected for processing (step 144) and tested to find out if it should be deleted, i.e., the pruner can delete the selected printer object should the need arise without violating a Policy (step 146). If the pruner should not delete the object at step 146, it loops back to step 144 to select another item in the list. It is to be noted that if there are no more unprocessed objects in the list then this phase of processing is complete, although this is not explicitly shown in FIG. 5.

If the pruner can delete the printer object without violating a Policy, it tests to find out if the logical printer corresponding to the printer object is actually available (step 148). If the logical printer is available and the GUID matches, the pruner loops back to step 144 to process another item in the list. Else, the printer object is likely to be an orphan and is added to a list of orphan printer items (step 150). If the server does not have the GUID of the printer object then it thinks the print object does not exist in the DS. Depending on the specified policy it may still be added to the list of orphaned printer objects or merely ignored.

FIG. 6 illustrates a possible method to handle the list of the orphaned printer objects. Concurrently or following the preparation of the orphan printer object list, it can be processed (step 154). It should be noted that lists can be processed one item or several items at a time depending on the implementation. For instance, use of more than one thread or fibers may allow for the processing of several items concurrently in a logical sense. An item is picked from the list of orphaned printer objects (step 156) and tested in accordance with the policy to determine if it should be deleted (step 158). These tests may include reviewing the status of an associated logical printer two or three times or watching it for a specified duration to ensure that an object is not deleted due to a transient condition. Other possibilities include actually monitoring the logical device, possibly using a low priority thread, to determine if it is actually inaccessible. In a preferred embodiment, the logical device, such as a logical printer, is visited every eight hours and at the third visit it is conclusively presumed to be inaccessible if it is still non-responsive. Next it is determined if it is permissible to delete the object in accordance with the policy (step 160). If the object can be deleted, then it is deleted from the directory (step 162), i.e., it is no longer published. If there are more items to process in the list of orphaned objects (step 164), then the next item is processed, else the pruner module sleeps for a prescribed duration prior to starting again.

It should be noted that the deletion of the printer from the directory need not result in the complete deletion of the object. Thus, it may still reside at a print server, but it is no longer published. If a server detects that a print object that ought to be published, has been deleted, then it republishes it. This may happen if a print server was down for a prolonged period of time. When it is restarted, it tests the published status of its printer objects, and restores the published status.

Old version of server software may not provide this functionality, hence in some preferred embodiments the version of the software is tested as part of the policy to decide whether to allow pruning of printer objects. This is an administrative decision that is advantageously implemented by setting an appropriate policy. Similarly, published printers from other domain trees or even other forests are not easily restored or tested. Such printer objects may also be exempted from pruning to ensure their availability.

A possible set of policies to be used in deciding if a printer object should be pruned in a preferred embodiment could include the following. The directory service ("DS") component of the Spooler is initialized during localspl initialization by a call to InitializeDS. If a given machine is a Domain Controller and a Directory Service is detected, InitializeDS creates a DS Pruning thread called DsPrune. DsPrune determines the Site on which the DC is running, then searches the entire Domain for all PrintQueue objects. For each PrintQueue returned in the search, DsPrune checks the Print Server's Site. If the Server's Site matches the DC's Site, then DsPrune verifies that the Server exists. If the Server exists, an OpenPrinter command is issued and, if the Printer exists and the Printer's GUID matches the GUID of the PrintQueue in the DS, DsPrune will go on to check the next PrintQueue found in the search.

If OpenPrinter fails to find the Printer pointed to by the UNCName attribute, several steps are possible. If the LSB of the Flags property is set (0x00000001), the PrintQueue is not deleted since this marks the printer object as being undeleteable. If the PrintQueue Version corresponds to NT5 or greater OR iSPLREG_PRUNE_DOWNLEVEL_NICELY is FALSE OR the Print Server exists, then the PrintQueue is deleted. At this stage a PrintQueue corresponding to another forest may not be deleted unless adequate support is available in the operating system as indicated by the version number. However, regardless of the success or failure of OpenPrinter, if the PrintQueue VersionNumber, UNCName, or ServerName attribute is not set, the PrintQueue will be deleted.

In a preferred embodiment, the "WINDOWS 2000®" server operating system manufactured by the "MICROSOFT®" of Redmond, Wash., DsPrune behavior is determined by four policy values found in the registry. These policies include specification of several parameters described next.

PruneDownlevelNicely: REG_DWORD 1 is default, range is 0-1

Description: If a printer does not exist on the server or the server is not found, and the PrintQueue version is greater than or equal to the PruningVersion, then if PruneDownlevelNicely is 0, PrintQueues having version 2 or lower will be deleted. Otherwise, if PruneDownlevelNicely is 1 and the other conditions are true, then PrintQueues having version 2 or less will not be deleted.

English Description: 0=Downlevel (non-NT5 or later) printers will be unpublished if the print server or printer is not found. 1=Downlevel printers will be unpublished only if the server is found and the printer does not exist on the server.

PruningInterval: REG_DWORD 1440 (decimal) is default, range is 0-0xFFFFFFFF

Description: The PruningInterval determines the number of minutes the printer unpublisher sleeps between checks for orphaned printers. A value of 0xFFFFFFFF will cause the printer unpublisher to never check for orphaned printers. The printer unpublisher checks the PruningInterval value every hour.

PruningVersion: REG_DWORD 3 is default, range is 0-0xFFFFFFFF

Description: The printer unpublisher will not unpublish printers having a PrintQueue version less than the PruningVersion value. This ensures that the server software is designed to cope with the possibility of accidental pruning of published objects.

Example Usage: If you want NT4 printers to be pruned, set this value to 2. The PruningVersion corresponds to the NT Spooler version.

PruningPriority: REG_DWORD 0 is default, range is −2 to 2

Description: −2=THREAD_PRIORITY_LOWEST; −1=THREAD_PRIORITY_BELOW_NORMAL; 0=THREAD_PRIORITY_NORMAL; 1=THREAD_PRIORITY_ABOVE_NORMAL; 2=THREAD_PRIORITY_HIGHEST Example Usage: Use this parameter to lower or raise the priority of the pruning thread.

VerifyPublishedState: REG_DWORD −1 is default (INFINITE), range is 30 to 1440 minutes.

Description: Causes print server to verify that published printers are still published, at intervals set by the VerifyPublishedState value.

Example: Set this parameter to a non-default value if you see printers being unpublished due to network connectivity problems.

PublishPrinters: REG_DWORD 1 is default, range is 0-1

Description: 0=User does not publish printers by default. And, 1=User publishes printers by default.

The invention is not limited to the management of printer objects in a network, but instead may be tailored to manage objects of selected types, together or separately. Preferably, the term "object" is used to refer to data structures containing references and attributes for logical devices and, possibly, software modules. Thus, the logical devices and modules provide the actual functionality. Furthermore, objects of different types, e.g., printer objects and fax machine objects, may be managed by the same pruning module or by separate modules or different instances of the same module.

Figure 7:
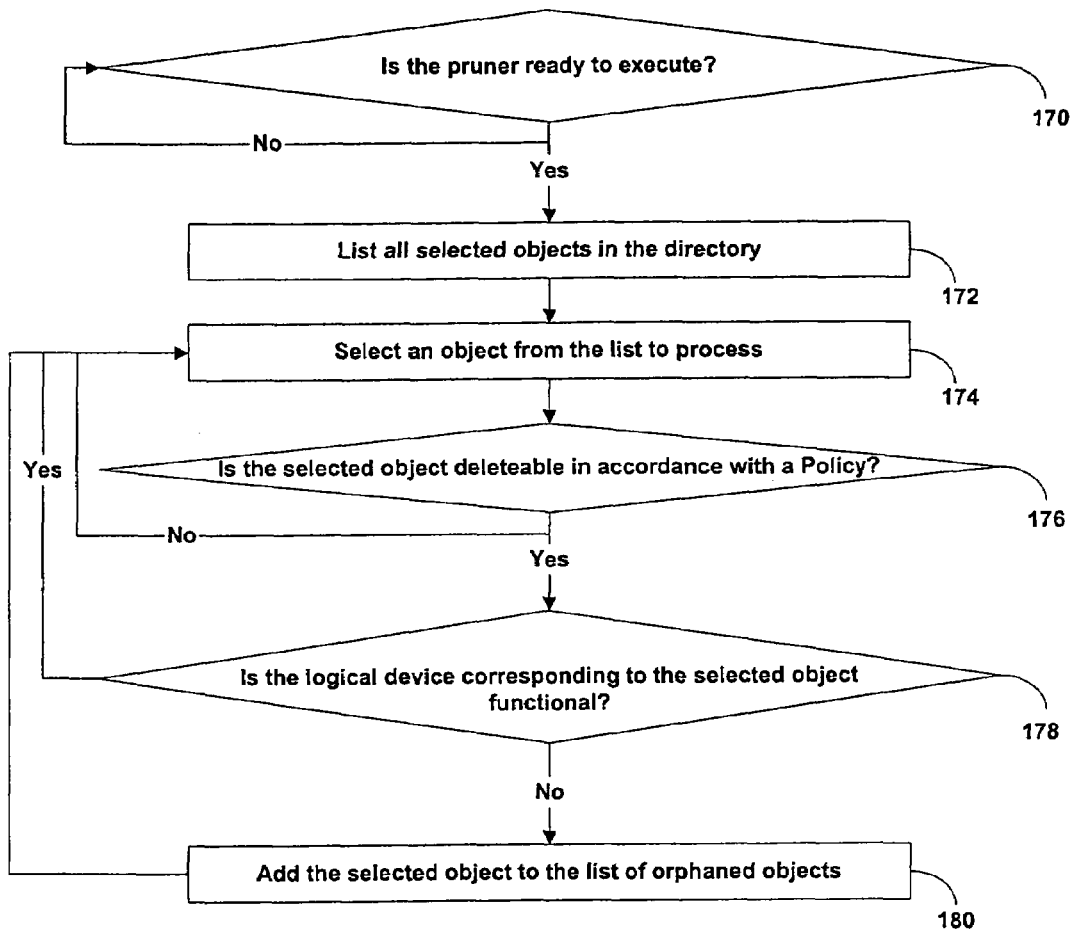
FIG. 7 illustrates a possible implementation of the pruner in generating a list of orphaned objects in general.
Figure 8:
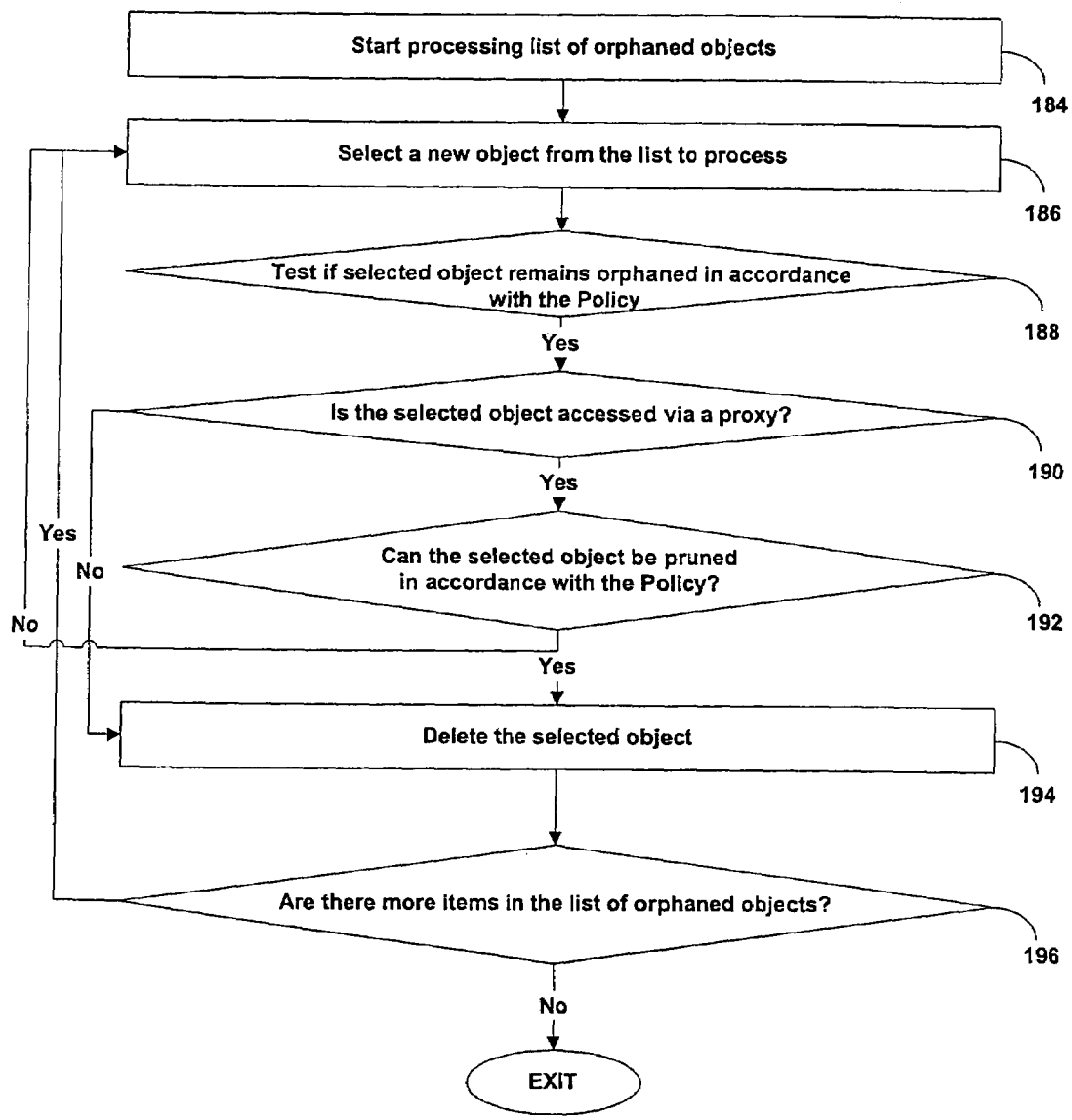
FIG. 8 illustrates a possible strategy in actually pruning objects in the list of orphaned objects.

These aspects of the invention are described in the exemplary embodiments illustrated in FIGS. 7 and 8. Turning to FIG. 7, the pruner module is launched if it is ready to execute (step 170). The pruner is preferably implemented on its own thread that has an assigned priority. If the pruner is ready to execute, a list is made of the objects of a type to be managed by aid of a pruner, which is available at the domain controller (step 172). The type may be specified by a user or provided in the registry, e.g., as a default, or by an administrator. One of the items in the list of objects is selected for processing (step 174) and skipped if it should not be deleted in accordance with a Policy (step 176) by looping back to step 174 to pick another item in the list.

If the selected object may be deleted without violating the Policy, the logical device or module corresponding to the selected object is tested to find out if it is accessible/functional (step 178). If the selected object has valid references and attributes, e.g., the same GUID as the server hosting the logical device/module, the pruner loops back to step 174 to process another item in the list. Else, the selected object is likely to be an orphan and is added to a list of orphan objects (step 180). If the server does not have the GUID of the selected object then it is possible that the selected object is being accessed through a proxy. Depending on the specified policy it may still be added to the list of orphaned objects.

FIG. 8 illustrates a possible method, in accordance with the invention, to handle the list of the orphaned objects. Concurrently or following the preparation of the orphan object list, it can be processed (step 184). An item is selected from the list of orphaned objects (step 186) and tested in accordance with the policy to determine if it should be deleted (step 188). These tests may include reviewing the status of the selected object two or three times or watching it for a specified duration to ensure that an object is not deleted due to a transient inaccessibility. Other possibilities include actually monitoring the selected object, possibly using a low priority thread, to determine if it is actually orphaned. If the selected object is accessed through a proxy (step 190) then it is determined if it is permissible to delete it in accordance with the policy (step 192). If the selected object can be deleted, then it is deleted from the directory (step 194), i.e., it is no longer published. If there are more items to process in the list of orphaned objects (step 196), then the next item is processed else the pruner module sleeps for a specifiable period before checking for orphans again.

It should be noted that the deletion of the selected object from the directory does not result in the complete deletion of the object. Thus, it may still reside at a server, but it is no longer published. If a server detects that a deleted object that ought to be published then it republishes it. This may happen if a server was down for a prolonged period of time. When it is restarted, it tests the published status of its objects, and restores the published status.

While much of the description of embodiments in accordance with the invention is in the "WINDOWS®" OS environment, this description is not intended to exclude other OSs such as the "MACINTOSH®," "SOLARIS®" and other UNIX based platforms along with distributed computing.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for managing objects of a specified category in a directory maintained at a server in a computer network comprising a plurality of servers, each of the objects of the specified category corresponding to a distinguished name, the method effective in reducing accumulation of non-functional objects without sacrificing performance, and the method being executed in accordance with a desired priority on the server in the computer network, the method comprising:
   identifying objects of the specified category in the directory, each of the objects providing a reference to a resource desired to be made accessible to one or more users in the computer network;
   selecting a first identified object from the objects in the directory;
   determining, if the first identified object is deleteable, whether the resource referenced by the first identified object is accessible in the computer network by testing the first identified object for validity of the reference to the resource in the computer network, the testing comprising:
      identifying a machine acting as a domain controller for the first identified object;
      determining a site on which the domain controller is running;
      searching a domain associated with the domain controller for the first identified object;
      checking a server site for the first identified object; and
      verifying that the server exists and comparing an identification of a resource referenced by die first identified object with an identification of the first identified object;
   marking the first identified object for deletion if it does not have a valid reference to the resource; and
   deleting the marked first identified object from the directory, wherein the resource represented by the first identified object is less accessible in the computer network after the deletion.

2. The method of claim 1, further comprising retesting the marked first identified object for validity of the reference to the resource in the computer network.

3. The method of claim 1, wherein the directory is a collection of published objects.

4. The method of claim 1, wherein the specified category is printer objects.

5. The method of claim 1, further comprising determining if the first identified object is deletable based on a specifiable policy.

6. The method of claim 5, wherein the specifiable policy does not allow deletion of the first identified object if the first identified object is hosted by a software version not supporting republishing the first identified object.

7. The method of claim 5, wherein the specifiable policy does not allow deletion of the first identified object if the first identified object is marked as being persistent.

8. The method of claim 5, wherein the specifiable policy does not allow deletion of the first identified object if the first identified object is accessed through a proxy.

9. The method of claim 5, wherein the specifiable policy does not allow deletion of the first identified object if the first identified object is hosted by a specified server in the network.

10. The method of claim 5, wherein the specifiable policy does not allow deletion of the first identified object if the first identified object is in another domain.

11. The method of claim 5, wherein the specifiable policy does not allow deletion of the first identified object if the first identified object is in another forest.

12. The method of claim 1, wherein accessing the first identified object comprises accessing a parent node, wherein the parent node is determined from the distinguished name of the first identified object.

13. The method of claim 12, further comprising accessing the parent node to detect a unique identifier for the first identified object to determine if the first identified object is hosted at the parent node.

14. The method of claim 1, wherein the method is implemented on a thread executing on a domain controller.

15. A computer readable media having computer executable instructions for carrying out the steps of a method for managing objects of a specified category in a directory maintained at a server in a computer network comprising a plurality of servers, each of the objects of the specified category corresponding to a distinguished name, the method effective in reducing accumulation of non-functional objects without sacrificing performance, the method comprising the steps of:
   identifying objects of the specified category in the directory, each of the objects providing a reference to a resource desired to be made accessible to one or more users in the computer network;
   selecting a first identified object from the objects in the directory;
   determining, if the first identified object is deleteable, whether the resource referenced by the first identified object exists in the computer network by testing the first identified object for validity of the reference to the resource in the computer network, the testing comprising:
      identifying a machine acting as a domain controller for the first identified object;
      determining a site on which the domain controller is running;
      searching a domain associated with the domain controller for the first identified object;
      checking a server site for the first identified object; and
      verifying that the server exists and comparing an identification of a resource referenced by the first identified object with an identification of the first identified object;
   marking the first identified object for deletion if it does not have a valid reference; and
   deleting the marked first identified object from the directory, wherein the resource represented by the first identified object is less accessible in the computer network after the deletion.

* * * * *

UNITED STATES PATENT AND TRADEMARK OFFICE
CERTIFICATE OF CORRECTION

| | |
|---|---|
| PATENT NO. | : 7,444,352 B2 |
| APPLICATION NO. | : 10/858234 |
| DATED | : October 28, 2008 |
| INVENTOR(S) | : Steven B. Wilson |

It is certified that error appears in the above-identified patent and that said Letters Patent is hereby corrected as shown below:

In column 1, line 7, delete "continuation" and insert -- division --, therefor.

In column 1, line 8, delete "2000" and insert -- 2000, --, therefor.

In column 13, line 37, in Claim 1, delete "die" and insert -- the --, therefor.

Signed and Sealed this
Twenty-sixth Day of April, 2011

David J. Kappos
*Director of the United States Patent and Trademark Office*